US00RE37955E

(19) United States
(12) Reissued Patent
Kiczko et al.

(10) Patent Number: US RE37,955 E
(45) Date of Reissued Patent: Jan. 7, 2003

(54) COOKING APPARATUS WITH ADJUSTABLE WALLS

(76) Inventors: Wladyslaw Kiczko, 59 Flanders Rd., Budd Lake, NJ (US) 07828; Miroslaw Kiczko, 59 Flanders Rd., Budd Lake, NJ (US) 07828

(21) Appl. No.: 09/571,353

(22) Filed: May 15, 2000

Related U.S. Patent Documents

Reissue of:
(64) Patent No.: 5,921,172
Issued: Jul. 13, 1999
Appl. No.: 09/039,433
Filed: Mar. 16, 1998

(51) Int. Cl.[7] ..... A47J 27/62; A47J 27/00
(52) U.S. Cl. ..... 99/416; 99/426; 99/449
(58) Field of Search ..... 99/426, 410, 413, 99/414, 416, 341, 402, 449, 427; 248/317, 318, 320, 323, 324

(56) References Cited

U.S. PATENT DOCUMENTS

| | | | | |
|---|---|---|---|---|
| 474,446 | A | 5/1892 | Fey | |
| 2,032,175 | A | 2/1936 | Jones | 219/43 |
| 2,080,655 | A | 5/1937 | Crawford | 206/15.1 |
| 2,975,698 | A | 3/1961 | Miller | 99/390 |
| 3,282,460 | A | 11/1966 | Boznango | 220/19 |
| 3,552,297 | A | 1/1971 | Williams | 99/271 |
| 4,224,864 | A | 9/1980 | Wendell | 99/349 |
| 4,287,818 | A | 9/1981 | Moore et al. | 99/355 |
| 4,297,942 | A | 11/1981 | Benson et al. | 99/386 |
| 4,472,448 | A | 9/1984 | Haggerty et al. | 426/589 |
| 4,508,027 | A | 4/1985 | McCord | 99/416 |
| 4,548,130 | A | 10/1985 | Diener et al. | 99/345 |
| 4,815,368 | A | 3/1989 | Nelles | 99/452 |
| 4,851,241 | A | 7/1989 | Tsuji et al. | 426/56 |
| 4,854,227 | A | 8/1989 | Koopman | 99/416 |
| 5,195,426 | A | 3/1993 | Thuli | 99/452 |
| 5,216,947 | A | 6/1993 | Cheng | 99/417 |
| 5,265,523 | A | 11/1993 | Mino et al. | 99/367 |
| 5,567,466 | A | 10/1996 | Dupont-Delhovren | 426/641 |
| 5,706,718 | A | 1/1998 | Svensson | 99/416 |

FOREIGN PATENT DOCUMENTS

| | | | |
|---|---|---|---|
| DE | 2245816 | 5/1973 | 99/402 |

*Primary Examiner*—Reginald L. Alexander
(74) *Attorney, Agent, or Firm*—Thomas L. Adams

(57) ABSTRACT

Apparatus can cook foodstuffs with a pot and at least one support assembly adapted to rest atop the pot. The support assembly has a pair of walls. Each of the walls is dependently mounted from the support assembly. The walls are spaced apart an adjustable amount. The support assembly also has a floor hinged to and spanning the pair of walls.

24 Claims, 3 Drawing Sheets

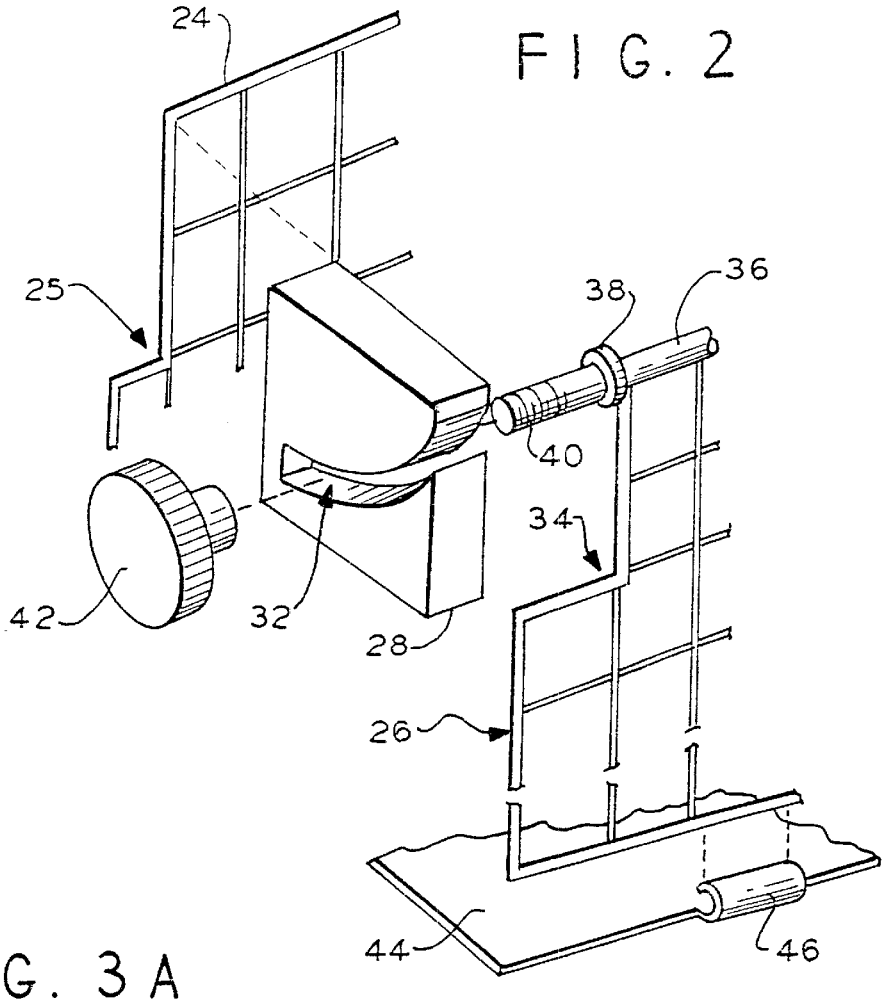
FIG. 2
FIG. 3A
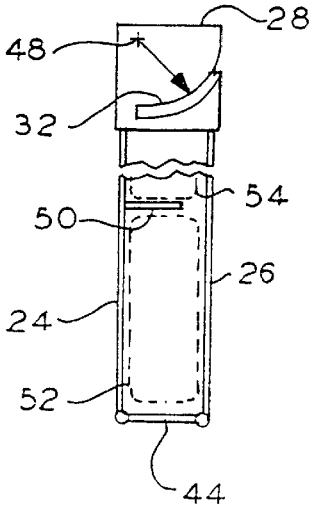
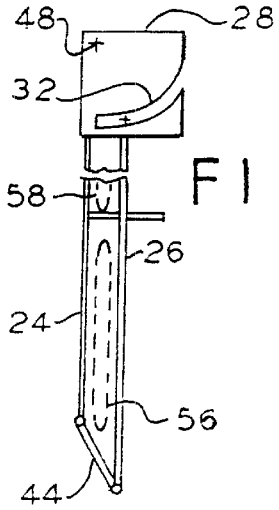
FIG. 3B

COOKING APPARATUS WITH ADJUSTABLE WALLS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to cooking apparatus, and in particular, to apparatus having adjustable walls.

2. Description of Related Art

There is increased concern about cooking foods thoroughly to eliminate bacteria. At the same time, consumers are interested in reducing the fat content in the cooked food below the levels normally associated with frying.

An efficient and popular method of cooking food is immersion in a heated liquid. A familiar cooker is a deep fryer where foodstuff is placed in a wire basket and lowered into a pot of hot oil. Food can also be cooked in a crock pot, which is typically a ceramic pot heated will electrical heater elements.

When used properly, these devices can kill bacteria, but cannot be used readily for many food products. One difficulty with the foregoing cooking devices is that the food products are kept loose. Some food products such as hamburger patties cannot be easily cooked in quantity when loosely placed inside such a cooking device. For example, liquid turbulence may break up the patties.

In U.S. Pat. No. 4,224,864 a number of horizontal, parallel plates are stacked together and slide on a number of posts. The plates are normally separated by springs but can be driven together by a cam lever to hold meat patties between the plates. Once secured, the patties can be immersed in a deep fry cooker. This reference does not allow a simple adjustment of the cooking space and will drive the plates against the food based on the force applied by the cam and spring.

In U.S. Pat. No. 5,195,426 a number of parallel shelves are held together by a chain or other device. When hoisted, the shelves separate to admit cheese. When lowered, the shelves collapse to hold the cheese in place. This reference does not concern cooking and does not allow adjustment of the space between shelves. Instead the shelf to shelf spacing is always the same. See also U.S. Pat. No. 4,815,368.

In U.S. Pat. No. 5,265,523 a hollow platform has a number of perforated dividers. Frozen food placed between the dividers can be defrosted by heating water that circulates through the dividers and past the frozen food. While vertical dividers are shown, the space between them is not adjustable.

U.S. Pat. No. 4,508,027 shows a divider in the form of a grid that can be placed in a variety of positions inside a frying basket. While the size of compartments inside the basket can thus be adjusted, the reference does not disclose an assembly with a hinged floor member. See also U.S. Pat. No. 4,854,227.

See also U.S. Pat. Nos. 474,446; 3,282,460; 3,552,297; 4,287,818; 4,297,942; 4,548,130; and 5,216,947.

U.S. Pat. Nos. 4,472,448 and 4,851,241 show sauces for treating meat products. See also U.S. Pat. No. 5,567,466.

Accordingly, there is a need for an improved cooking apparatus that can cook foodstuffs safely and efficiently in an adjustable cooking space.

SUMMARY OF THE INVENTION

In accordance with the illustrative embodiments demonstrating features and advantages of the present invention, there is provided an apparatus for cooking foodstuffs. The apparatus has a pot and at least one support assembly adapted to rest atop the pot. The support assembly has a floor and a pair of walls. Each of the walls is dependently mounted from the support assembly. The walls are spaced apart an adjustable amount. The floor is hinged to and spans the pair of walls.

By employing apparatus of the foregoing type, improved equipment is achieved for thoroughly and efficiently cooking foodstuffs. In a preferred embodiment, one wall is affixed to a support assembly. Another, movable wall is suspended from a shaft whose outer ends slide in arcuate slots formed in blocks mounted on the support assembly. The bottom edges of these two walls are spanned by a floor that is hinged to the two walls. The hinging is such that as the walls move together or separate, they remain parallel, although the floor may change its angle of elevation.

In this preferred embodiment, the support assemblies may be inserted or removed from bays in a lid that rests atop a pot containing a cooking fluid, such as a water-based sauce. Preferably, the pot contains electrical heating coils that are regulated by a thermostat to maintain a desired cooking temperature.

The apparatus may be formed as a small home cooking unit or as a larger commercial unit with many cooking bays. In a top end commercial unit, each cooking assembly in each bay includes a timer for scheduling the cooking interval for each bay. This unit can include perches or shelves between the walls of the support assemblies to allow food products to be vertically stacked without placing the entire weight of the stack on the bottom product.

With the preferred apparatus, food products such as hamburger patties, do not lose their shape, because the opposing walls of the assembly are in contact with the entire surface of the product. This contact is especially effective for embodiments where the walls are formed as a grid, as opposed to solid material. Moreover, the preferred embodiment is designed to hold the food products at a continuously adjustable range of thicknesses. Also, the food products need not be turned, and because they are separated, they do not stick together. Additionally, efficiency is greatly enhanced since the food products can be loaded at the same time, so they are ready at the same time.

BRIEF DESCRIPTION OF THE DRAWINGS

The above brief description as well as other objects, features and advantages of the present invention will be more fully appreciated by reference to the following detailed description of presently preferred but nonetheless, illustrative embodiments in accordance with the present invention, when taken in conjunction with the accompanying drawings, wherein:

FIG. 2 is a detailed, exploded view of a portion of the support assembly of FIG. 1;

FIG. 3A is simplified, schematic, end view of the support assembly of FIG. 1 with the walls maximally separated;

FIG. 3B is simplified, schematic, end view of the support assembly of FIG. 1 with the walls brought close together;

DETAILED DESCRIPTION OF THE PREFERRED EMBODIMENTS

Figure 1:
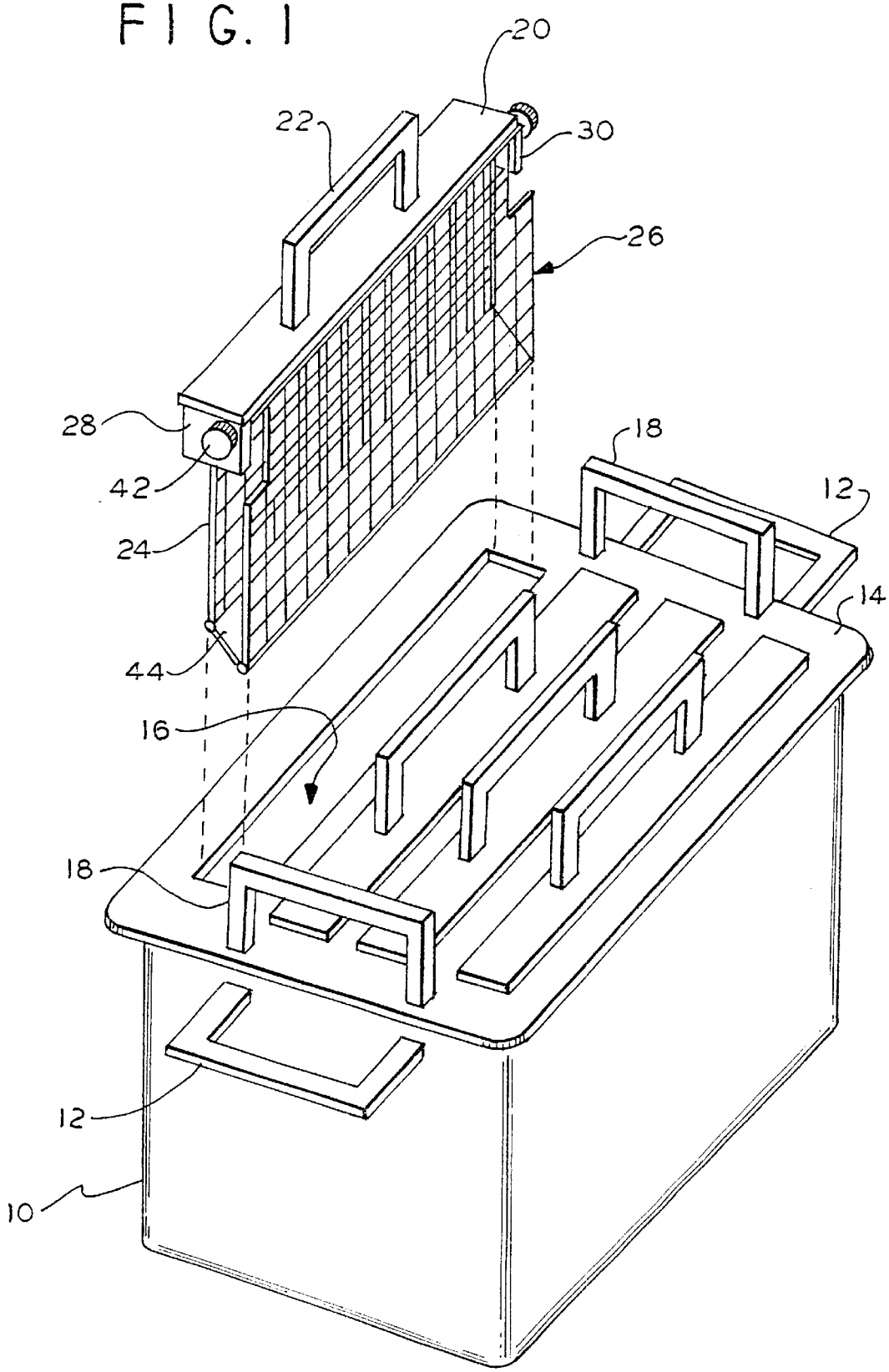
FIG. 1 is an axonometric view of cooking apparatus in accordance with principles of the present invention.

Referring to FIGS. 1 and 2, the present apparatus is illustrated as a pot 10, which may be a double-walled assembly formed as an inner container for holding a cooking fluid and an outer container spaced therefrom to make the pot 10 safe to touch. In one embodiment the inner container is ceramic and the outer container is a metal or plastic shell, although other materials may be used in other embodiments. The pot has a pair of horizontal handles 12.

In this embodiment pot 10 is 14 inches (35.5 cm) long, 12 inches (30.5 cm) wide and about 10 inches (25.4 cm) tall, although other sizes and proportions are contemplated, depending upon the desired capacity, number of cooking bays, the type and number of food products to be cooked, etc.

As described further hereinafter, electrical heating coils may be placed between the inner container and the outer container. The electrical heating coils may be arranged in a conventional manner with a thermostat and manual controls to regulate the heating effect of these coils.

The pot 10 is fitted with a lid 14 containing four parallel slots or bays 16, although a different number of slots may be employed in alternate embodiments. Lid 14 is shown with a pair of upright handles 18, although such handles may be eliminated in alternate embodiments. Lid 14 may be secured to the pot 10 by appropriate fasteners. It is preferred, however, that lid 14 can be lifted to allow access to the insides of pot 10 for cleaning.

A support assembly is shown herein as including a plate 20 with an upright handle 22. In this embodiment, plate 20 is 12 inches (30.5 cm) long and 2 inches (5 cm) wide, although other dimensions and proportions can be used in other embodiments. Plate 20 is preferably metal that is clad with an external, thermally insulating layer making plate 20 safe to touch. It will be appreciated that other heat resistant materials may be used in alternate embodiments.

A pair of wells 24 and 26 are shown supported by and depending from plate 20. Walls 24 and 26 are shown as stainless steel grids bordered by thicker stainless steel rods. A pair of members 28 and 30 are shown as slotted blocks, which are attached to the underside of plate 20 by welding or attachment with appropriate fasteners.

Wall 24 has a rectangular outline and may be 11 inches (28 cm) wide and 8 inches (20 cm) tall, although other dimensions and proportions are anticipated for other embodiments. Wall 24 may be attached at its upper corners to the blocks 28 and 30 and, along its upper edge, to the underside of plate 20. For this reason, wall 24 has notches 25, allowing the wall to fit around the blocks 28 and 30. Wall 24 is attached in such a way to keep it fixed in position relative to plate 20 without shifting or swinging.

Wall 26 also has a substantially rectangular outline with the same dimensions as wall 24, except for somewhat larger notches 34 located in the two upper corners of wall 26. The upper edge of wall 26 is attached to an upper peripheral rod 36. Rod 36 is a shaft having on each end an annular flange 38 bordering a threaded end portion 40. Threaded portion 40 is sized to slidably fit inside the arcuate slot 32 in block 28.

Arcuate slot 32 essentially follows a quadrant of a circle extending between opposite corners of the block 28. The upper end of the arcuate slot 32 breaches a vertical edge of block 28 to allow removal of the threaded end 40 of the shaft 36. Accordingly, the shaft 36 can be moved up and away from (or down and toward) wall 24 by following arcuate slot 32. The shaft 36 can be clamped into a desired position along the arcuate slot 32 by a clamping means, shown herein as knob 42. Knob 42 may be a plastic handle with an internally threaded metal insert (not shown) sized to screw onto the threaded end 40 of shaft 36. By tightening knob 42, flange 38 can be pulled against the inside surface of the block 28 (same effect at block 30). Thus knob 42 and flange 38 grab the block and hold shaft 36 in position.

A floor 44 is shown hinged to the bottom edges of the walls 24 and 26. Floor 44 is shown as a sheet metal panel, preferably 11 inches (28 cm) long and 1 inch (2.5 cm) wide, although other dimensions and proportions are contemplated for other embodiments. Floor 44 has a plurality of tabs 46 that are rolled as shown to embrace the lower edge of walls 24 and 26. In other embodiments the flow 44 can be hinged to the walls by means of separate brackets or by conventional hinges.

Referring to FIG. 3A, the wall 26 is shown clamped at an upper extreme position in arcuate slot 32. In this illustrated position, the wall 26 is in its highest position and spaced maximally from wall 24. Positioned in this fashion, the floor 44 is held substantially horizontal. The wall 26 can also be lowered to the position shown in FIG. 3B. In this illustrated position, the wall 26 is in its lowest position, closest to wall 24. Also, the floor 44 is shown tilted, forming an oblique angle with wall 24 and an acute angle with wall 26. By following slot 32, the upper edge of wall 26 stays at a fixed distance from the center 48 of the circle defining slot 32. Consequently, wall 26 acts as if it were hinged to a virtual panel that is hinged between center 48 and the upper edge of wall 26. Accordingly, walls 24 and 26 stay parallel and act as two opposite sides of parallelogram with the other two sides formed by floor 44 and the above mentioned virtual panel.

The fixed wall 24 is shown in FIG. 3A fitted with a perch 50. Perch 50 may be a number of horizontal pins attached to wall 24. Perch 50 acts as a shelf so that food products 52 and 54 can be stacked vertically without unduly compressing the food product on the bottom of the stack. Perch 50 is aligned with openings in the grid of wall 26 to protrude through these openings when the walls 24 and 26 are brought together as shown in FIG. 3B. In this Figure thinner food products 56 and 58 are shown between the walls 24 and 26.

Figure 4:
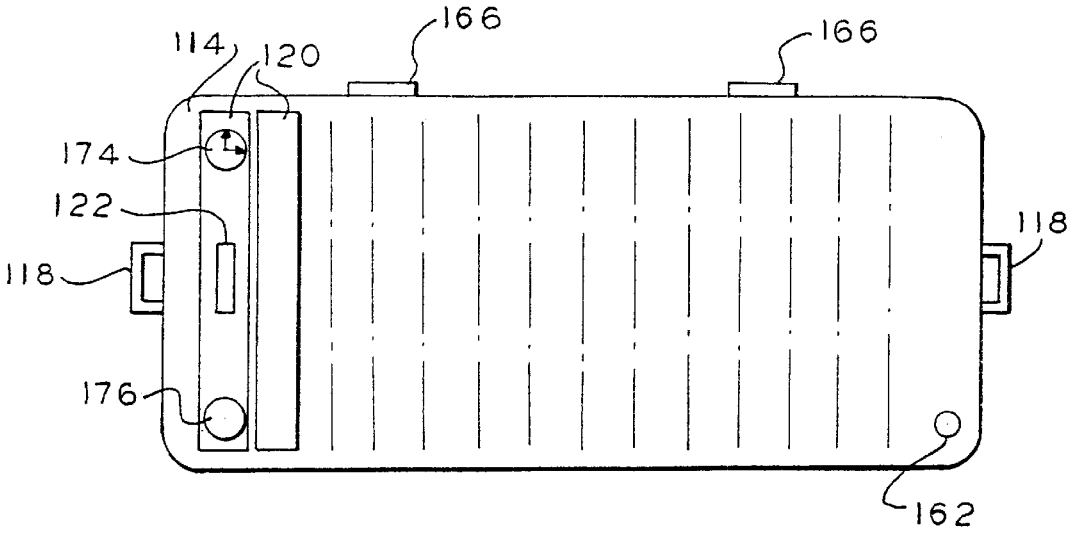
FIG. 4 is a top view of a cooking apparatus that is an alternate to that of FIG. 1.
Figure 5:
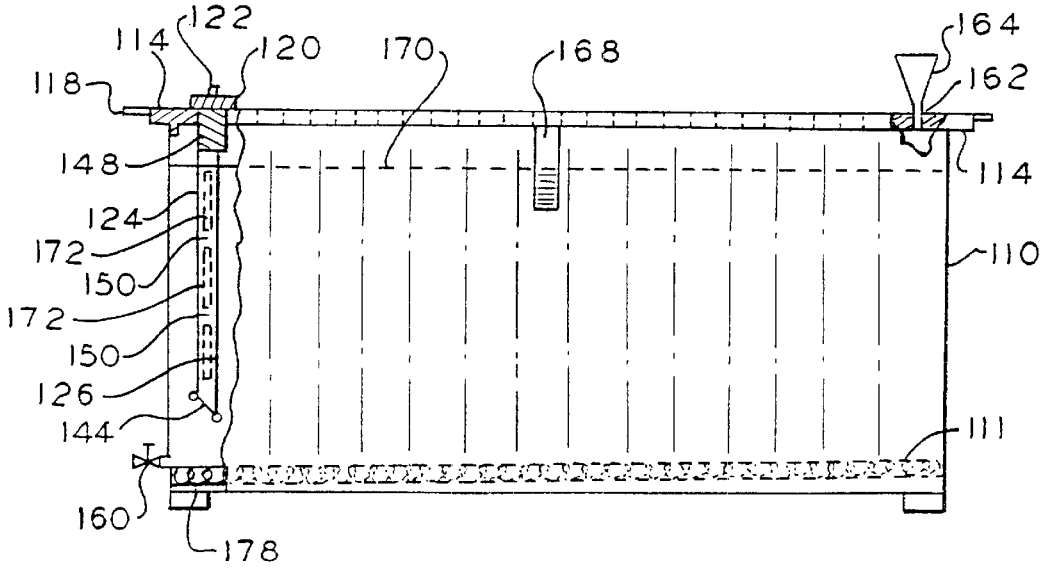
FIG. 5 is a front elevational view, partly in section, of the cooking apparatus of FIG. 4.

Referring to FIGS. 4 and 5, a commercial cooking apparatus is illustrated, which is an alternate to that shown in FIGS. 1 and 2. The illustrated apparatus is substantially larger and has fourteen bays. This apparatus has an overall length of 30 inches (76 cm), an overall width of 15 inches (38 cm), and an overall height of 16 inches (40.6 cm). In this embodiment, components having structure or functions similar to that illustrated in FIGS. 1 and 2 have the same reference numbers but increased by one hundred.

Here, pot 110 is in the form of a ceramic container mounted inside a sheet metal shell. The flow 111 of the ceramic container of pot 110 is slanted to drain towards outlet valve 160. Pot 110 has a lid 114 with an inlet 162 shown fitted with a funnel 164, for filling the pot 110. Lid 114 is attached to pot 110 by hinges 166. Thus, lid 114 can be swung about the hinges 166 by lifting lid 114, using handles 118.

The front of pot 110 has an inspection window 168. This inspection window is relatively narrow and extends from the top of pot 110 down about one quarter the height of the pot.

Window 168 is used to view the level 170 of the fluid inside pot 110. The fluid level 170 is shown sufficiently high to almost reach the underside of the blocks 148.

Each of the fourteen bays of pot 110 is shown with a support assembly including a support plate 120 with a strap 122, which can connected to a lifting handle (not shown). As before, support plate 120 has mounted below it a block 148 with an arcuate slot to support a movable wall 126. Again, a fixed wall 124 is mounted between the blocks 148 to the underside of support plate 120. Fixed wall 124 is shown with a number of perches 150 to hold food products 172. Walls 124 and 126 are again designed to have a variable spacing that can be changed by clamping the upper edge of movable wall 126 in the block 148.

In this embodiment, each of the support panels 120 has a timer 174. Each timer can be set for a predetermined time interval. This time interval is set depending upon the type of food being cooked. When the time interval elapses, a ready light 176 is illuminated. While individual timers and ready lights are illustrated, in alterante embodiments a single timer and ready light may be mounted on the lid 114 to serve all of the bays. Such an arrangement assumes that all the bays will be loaded and unloaded simultaneously.

To facilitate an understanding of the principles associated with the foregoing apparatus, its operation will be briefly described in connection with the embodiment of FIGS. 1 and 2 (although the operation of the other embodiment will be similar). In operation, pot 10 will be first filled with a cooking fluid. Preferably, the pot 10 will be filled with a water-based sauce. This reduces the fat content of the food, in comparison to food that is cooked in an oil-based sauce. The internal heaters are then electrically powered to heat the sauce in pot 10. When the sauce is sufficiently hot (depending upon the type of food to be cooked) the support assemblies can be loaded with foodstuffs.

The assembly in each of the bays 16 can be lifted by means of handle 22. Next the knobs 42 are loosened (but need not be removed) to free the wall 26 from the blocks 28. Consequently, wall 26 can be swung away from wall loaded against wall 24 and then wall 26 can be swung into back into a closed position. Specifically, the threaded end 40 of shaft (FIG. 2) can be slid back into arcuate slot 32. Shaft 36 is then pushed toward wall 24 to grip the foodstuffs between the walls with an appropriate amount of force. As shaft 36 is adjusted, the floor 44 swings as illustrated in FIGS. 3A and 3B. During this adjustment the walls 24 and 26 remain parallel. Once properly set, the knobs 42 are tightened to clamp shaft 36 in position.

Once loaded, the support assemblies can be lifted by means of handles 22 and placed in the appropriate bay 16. This process is repeated for each of the bays until each is loaded with the food to be cooked. It will be appreciated that not all bays need to be loaded with food in every cooking session.

The user will allow an appropriate amount of time to elapse so that the food inside pot 10 will be sufficiently cooked. Because the food is immersed in very hot liquid, there will be thorough cooking and elimination of bacteria. Also, where the hot liquid inside pot 10 is water-based, the fat content of the foodstuffs between walls 24 and 26 will be reduced by the leaching of fat into the liquid inside pot 10.

The food can be unloaded by lifting the support assemblies by means of the handles 22. The movable walls 26 can be freed by loosening the knobs 42. As before, the wall 26 can swing away from block 28 and wall 24 to allow the food to fall out of the assembly. The process can be completed by closing wall 26 (either with or without a new load of uncooked food) by sliding shaft 36 back into slot 32 of block 28 and clamping the shaft by tightening knob 42. Then the assembly can be replaced in the bay 16, again using the handle 22.

The operations with respect to the embodiment of FIGS. 4 and 5 are similar. This latter embodiment, however, has additional features such as the timer 174, which operates the ready light 176. Also, the temperature of the cooking fluid can be established by a thermostat regulating the heater coils 178. Moreover, since the walls 124 and 126 are taller, more foodstuffs can be placed between them. In this embodiment, two rows of perches 150 are employed to allow three rows of foodstuffs. In addition, the cooking fluid inside pot 110 can be quickly drained daily by opening drain valve 160. The following day, the cooking fluid can be quickly added by filling pot 110 through opening 162 using funnel 164. The filling can be controlled by observing level 170 through window 168. Window 168 can be examined periodically throughout the day to refill pot 110 if necessary due to evaporation or migration of cooking fluid into food products that are subsequently removed.

It will be appreciated that various modifications may be implemented with respect to the above described, preferred embodiments. Instead of a threaded rod clamped by a knob, other embodiments may employ a series of notches for holding the shaft, or other types of holding mechanisms. While a grid is shown for the parallel walls, alternative walls may include sheet metal with perforations or slots. In still other embodiments, one of the walls may be imperforate. Also, the floor of the food supporting assembly may in some embodiments be perforated, be formed of a grid, or have some alterante structure. While keeping the walls that hold the food parallel is desirable, in some embodiments one may allow the walls to converge or diverge, especially for irregularly shaped food products. In some embodiments the cooking fluid may be heated by other means, such as a combustion source.

Obviously, many modifications and variations of the present invention are possible in light of the above teachings. It is therefore to be understood that within the scope of the appended claims, the invention may be practiced otherwise than as specifically described.

We claim:

1. Apparatus for cooking foodstuffs [in a pot] *with a heater*, comprising:

at least one support assembly adapted to [rest atop said pot] *hold said foodstuffs at said heater*, said support assembly including:

a pair of walls, each [dependently] mounted from said support assembly, said walls *facing each other and* being spaced apart an adjustable amount; [and]

a [floor] *structure* hinged to and spanning said pair of walls*; and* [an adjustable one of said walls being spatially adjustable to move, relative to the other one of said walls: (a) together and down, or (b) apart and up, whereby one of said walls can be made lower in elevation than the other one of said walls] *at least one member attached to at least one of said walls and coupled between said walls for adjustably setting the relative position of said pair of walls by establishing either: (a) a first motion incorporating both a converging and a sideward movement of said walls or (b) a second motion that is the reverse of the first motion.*

2. Apparatus according to claim 1 wherein at least one of said walls comprises a grid.

3. Apparatus according to claim 1 wherein each of said walls comprise a grid.

4. Apparatus according to claim 1 wherein one of said walls is affixed in said support assembly.

5. Apparatus according to claim 1 wherein one of said walls is affixed and the other one of said walls is spatially adjustable in said support assembly.

6. Apparatus according to claim 5 wherein said [floor] *structure* is hinged to fold up toward one of said walls as the walls approach each other.

7. Apparatus according to claim 6 wherein said floor is hinged to become [level] *perpendicular to the walls* as the walls reach a maximum separation.

8. Apparatus according to claim 6 wherein said [floor] *structure* comprises sheet metal.

9. Apparatus according to claim 1 wherein said support assembly comprises:

a member with an arcuate slot, said adjustable one of said walls being adjustably mounted in said arcuate slot.

10. Apparatus according to claim 9 wherein the adjustable one of said walls has a[n upper] peripheral rod slidably mounted in said arcuate slot of said member.

11. Apparatus according to claim 1 wherein said support assembly comprises:

a spaced pair of members each with an arcuate slot, the adjustable one of said walls having a[n upper] peripheral rod slidably mounted in the arcuate slot of each of said members.

12. Apparatus according to claim [11] *1* comprising:

*at least one member having an arcuate slot, the adjustable one of said walls having a peripheral rod slidably mounted in the arcuate slot of said member; and* a clamping means for releasably holding said peripheral rod in position in the arcuate slot of said member.

13. Apparatus according to claim 1 wherein a first one of said walls is fixed in said support assembly, and the other one of said walls is spatially adjustable to move, relative to the first one of said walls: (a) [down and] together *and away from said support assembly*, or (b) [up and] apart *and toward said support assembly*.

14. Apparatus according to claim 1 comprising:

at least one perch attached to one of said walls above said floor for supporting foodstuff above said floor.

15. Apparatus according to claim 14 wherein that one of said walls supporting said perch is fixed in said support assembly.

16. Apparatus according to claim 1 wherein said at least one support assembly comprises a plurality of support assemblies, said [pot] *heater* being sized to allow said plurality of support assemblies to rest atop said [pot] *heater* simultaneously.

17. Apparatus according to claim 16 comprising:

a lid on said [pot] *heater* having a plurality of parallel slots sized to separately receive the plurality of support assemblies.

18. Apparatus according to claim 17 wherein said lid is hinged to said [pot] *heater*.

19. Apparatus according to claim 16 comprising:

a heater *device* mounted in said [pot] *heater* for heating fluid in said [pot] *heater*.

20. Apparatus according to claim 19 wherein said *heater comprises a* pot [has] *having* a viewing window for visually inspecting fluid level in said pot.

21. Apparatus according to claim 19 wherein said *heater comprises a* pot [has] *having* a drain for draining fluid in said pot.

22. Apparatus according to claim 21 wherein said pot has a fill port for adding fluid to said pot.

23. Apparatus according to claim 21 wherein said pot has a pair of handles for carrying said pot.

*24. Apparatus according to claim 1 wherein said support assembly has a handle for carrying said support assembly.*

* * * * *